United States Patent
Gdalyahu et al.

(10) Patent No.: US 10,025,998 B1
(45) Date of Patent: *Jul. 17, 2018

(54) OBJECT DETECTION USING CANDIDATE OBJECT ALIGNMENT

(71) Applicant: Mobileye Vision Technologies Ltd., Jerusalem (IL)

(72) Inventors: Yoram Gdalyahu, Jerusalem (IL); Harel Livyatan, Modiin (IL); Oded Schwarz, Jerusalem (IL); Yoav Taieb, Jerusalem (IL); Gideon P. Stein, Jerusalem (IL); Kfir Viente, Ramat Gan (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 132 days.

This patent is subject to a terminal disclaimer.

(21) Appl. No.: 14/858,798

(22) Filed: Sep. 18, 2015

Related U.S. Application Data

(63) Continuation of application No. 13/493,136, filed on Jun. 11, 2012.

(60) Provisional application No. 61/494,953, filed on Jun. 9, 2011.

(51) Int. Cl.
*G06K 9/00* (2006.01)
*G06T 7/00* (2017.01)

(52) U.S. Cl.
CPC ..... *G06K 9/00805* (2013.01); *G06K 9/00369* (2013.01); *G06K 9/00818* (2013.01); *G06K 9/00825* (2013.01); *G06T 7/003* (2013.01); *G06T 7/0081* (2013.01); *G06T 2207/20081* (2013.01); *G06T 2207/30196* (2013.01); *G06T 2207/30236* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 6,128,397 A | * | 10/2000 | Baluja | G06K 9/00241 382/118 |
| 6,915,025 B2 | * | 7/2005 | Wang | G06K 9/00248 382/165 |
| 7,197,186 B2 | * | 3/2007 | Jones | G06K 9/00228 382/224 |

(Continued)

OTHER PUBLICATIONS

Pose estimation—localization, Ozuysal et al, IEEE, 978-1-4244-3991,2009, pp. 778-785.*

(Continued)

*Primary Examiner* — Jayesh A Patel
(74) *Attorney, Agent, or Firm* — Morrison & Foerster LLP

(57) ABSTRACT

Classification of an object in the field of view of a camera. A processor is configured to capture multiple image frames from the camera. A candidate image is detected in the image frames. Alignment of the candidate image is determined relative to at least one previously known training image by inputting the candidate image into a trained alignment classifier and outputting one or more alignment variables therefrom associated with the candidate image. The candidate image and the alignment variable(s) are input into a trained object classifier. The object is classified responsive to the alignment variable(s).

11 Claims, 7 Drawing Sheets

(56) References Cited

U.S. PATENT DOCUMENTS

| | | | | |
|---|---|---|---|---|
| 8,064,643 B2* | 11/2011 | Stein | .................. | G06K 9/00818 |
| | | | | 382/103 |
| 8,144,976 B1* | 3/2012 | Shiell | ..................... | G06K 9/621 |
| | | | | 345/420 |
| 8,306,265 B2* | 11/2012 | Fry | ..................... | A61B 5/0452 |
| | | | | 348/143 |
| 8,558,892 B2* | 10/2013 | Brodsky | .............. | G01S 3/7864 |
| | | | | 348/155 |
| 8,995,723 B2* | 3/2015 | Stein | .................. | G06K 9/00818 |
| | | | | 382/103 |
| 9,020,188 B2* | 4/2015 | Yeh | ..................... | G06K 9/6257 |
| | | | | 382/103 |
| 9,183,447 B1* | 11/2015 | Gdalyahu | .......... | G06K 9/00791 |
| 9,639,747 B2* | 5/2017 | Zhu | .................... | G06K 9/00369 |
| 2004/0234136 A1* | 11/2004 | Zhu | ..................... | G06K 9/3241 |
| | | | | 382/224 |
| 2004/0258313 A1* | 12/2004 | Jones | ................. | G06K 9/00228 |
| | | | | 382/224 |
| 2006/0034484 A1* | 2/2006 | Bahlmann | .......... | G06K 9/00818 |
| | | | | 382/103 |
| 2006/0120604 A1* | 6/2006 | Kim | .................. | G06K 9/00228 |
| | | | | 382/181 |
| 2007/0047822 A1* | 3/2007 | Kitamura | ........... | G06K 9/00228 |
| | | | | 382/224 |
| 2007/0058836 A1* | 3/2007 | Boregowda | ........ | G06K 9/00771 |
| | | | | 382/103 |
| 2007/0086660 A1* | 4/2007 | Ai | ...................... | G06K 9/00208 |
| | | | | 382/226 |
| 2008/0253664 A1* | 10/2008 | Li | ...................... | G06K 9/00228 |
| | | | | 382/226 |
| 2009/0297038 A1* | 12/2009 | Ishikawa | .............. | G06K 9/3275 |
| | | | | 382/209 |
| 2010/0086214 A1* | 4/2010 | Liang | ................. | G06K 9/00248 |
| | | | | 382/197 |
| 2011/0293136 A1* | 12/2011 | Porikli | ............... | G06K 9/00771 |
| | | | | 382/103 |
| 2012/0114250 A1* | 5/2012 | Zhong | ................ | G06K 9/00228 |
| | | | | 382/195 |
| 2012/0274781 A1* | 11/2012 | Shet | ..................... | G06K 9/6857 |
| | | | | 348/169 |

OTHER PUBLICATIONS

Ozuysal et al. (2009). "Pose Estimation—localization," IEEE, pp. 778-785.
Gdalyahu et al., Office Action dated Dec. 26, 2014, directed to U.S. Appl. No. 13/493,136; 10 pages.
Gdalyahu et al., Office Action dated May 14, 2015, directed to U.S. Appl. No. 13/493,136; 8 pages.
Notice of Allowance received for U.S. Appl. No. 13/493,136, dated Jul. 7, 2015, 8 pages.
Notice of Allowance received for U.S. Appl. No. 13/493,136, dated Jul. 22, 2015, 2 pages.

* cited by examiner

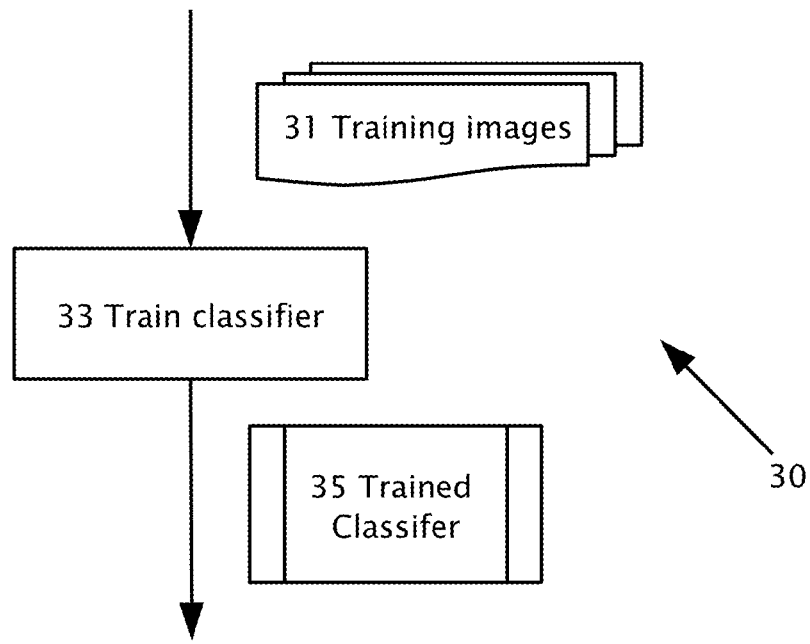
*Fig. 3*
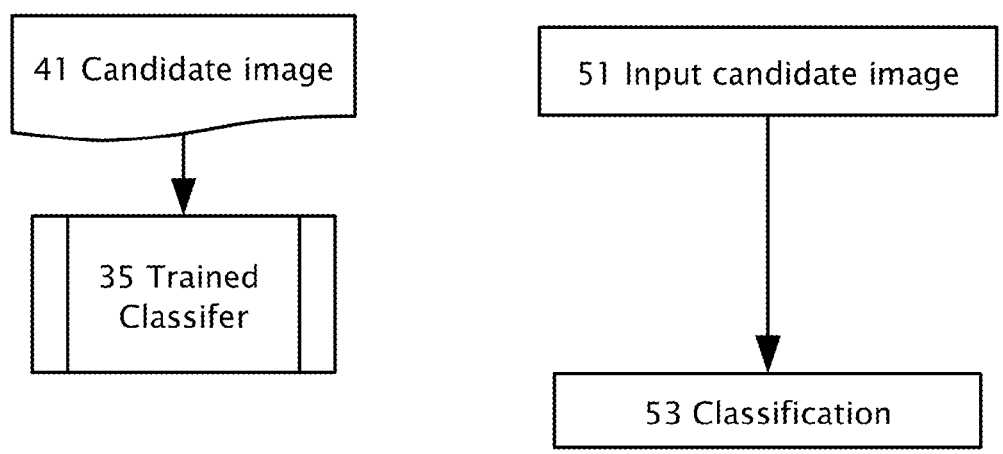
*Fig. 4*
*Fig. 5*

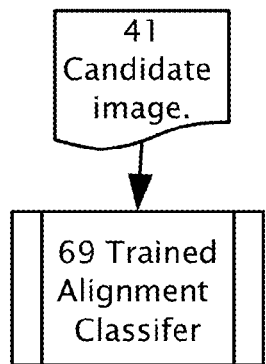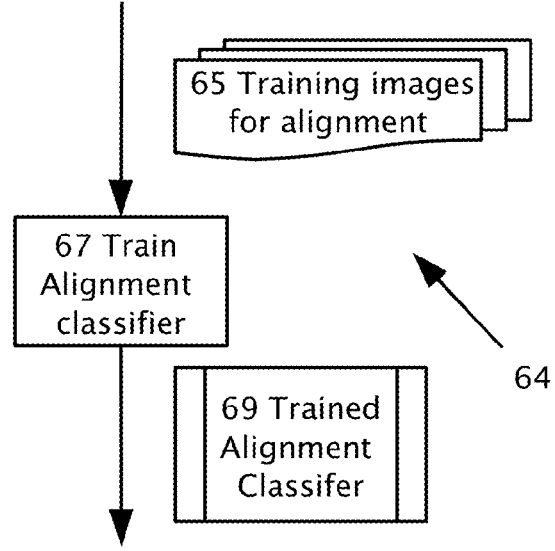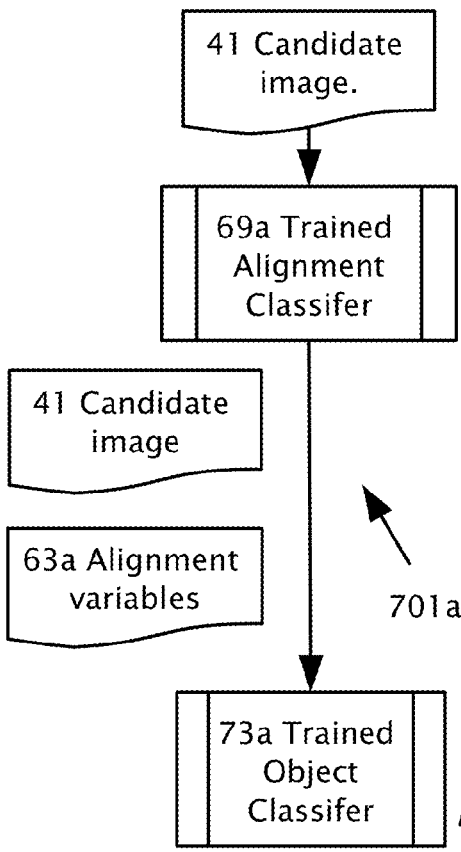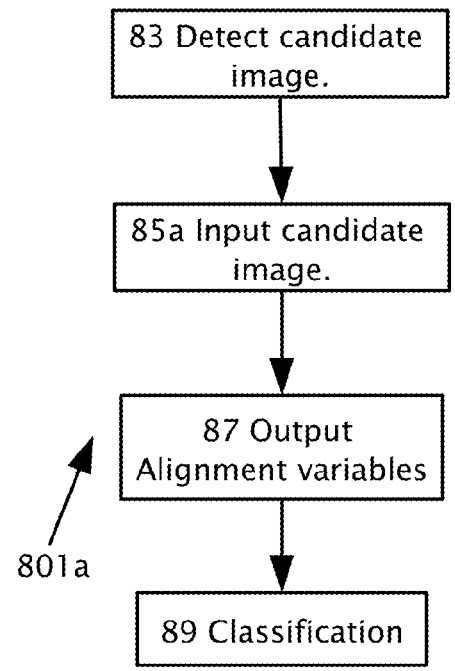
Fig. 6a
Fig. 6b
Fig. 7a
Fig. 8a

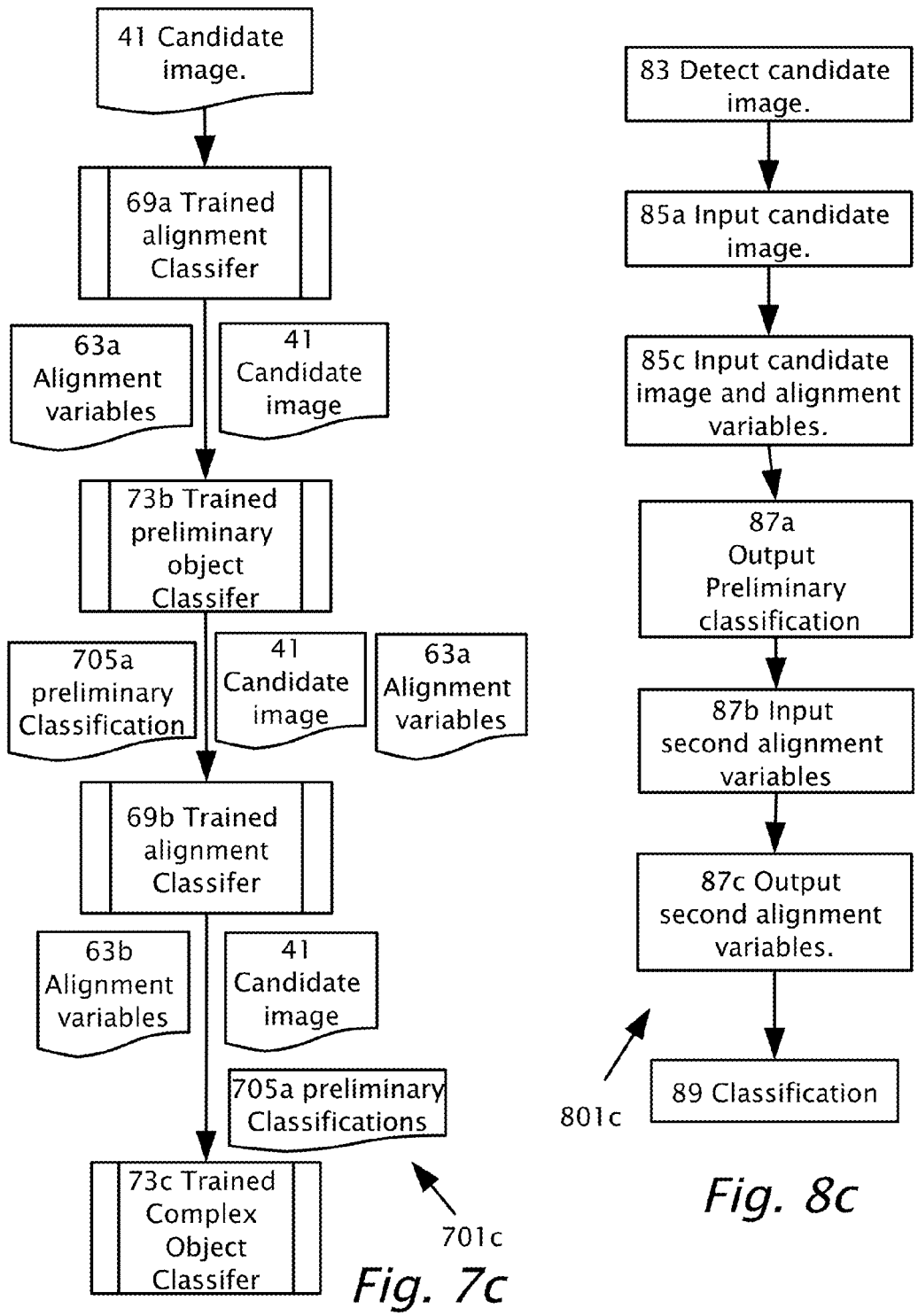

OBJECT DETECTION USING CANDIDATE OBJECT ALIGNMENT

CROSS REFERENCE TO RELATED APPLICATIONS

The present application is a continuation of U.S. patent application Ser. No. 13/493,136, filed Jun. 11, 2012, which claims priority to and the benefit of U.S. Provisional Application No. 61/494,953, filed Jun. 9, 2011, all of which are hereby incorporated by reference in the present disclosure in their entirety.

BACKGROUND

1. Technical Field

The present invention relates to driver assistance systems and in particular to methods for improving object detection from image frames captured from a camera.

2. Description of Related Art

During the last few years camera based driver assistance systems (DAS) have been entering the market; including lane departure warning (LDW), Automatic High-beam Control (AHC), pedestrian recognition, and forward collision warning (FCW).

Vehicle detection, pedestrian detection and traffic sign recognition algorithms share a common general structure: an initial candidate detection followed by more computationally expensive classification.

An algorithm for circular speed sign detection may use a Hough transform for finding circles. The Hough transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

BRIEF SUMMARY

Various methods are disclosed herein to classify an object in the field of view of a camera. A processor is configured to capture multiple image frames from the camera. A candidate image is detected in the image frames. Alignment of the candidate image is determined relative to at least one previously known training image by inputting the candidate image into a trained alignment classifier and outputting one or more alignment variables therefrom associated with the candidate image. The candidate image and the alignment variable(s) are input into a trained object classifier. The object is classified responsive to the alignment variable(s).

The processor and the camera may be included in a driver assistance system. The classification of the candidate image may include classification of the object as belonging to a single class of objects such as: pedestrians, traffic signs, vehicles or light sources.

The candidate image may be of a pedestrian and the alignment variables may be a vertical shift, a horizontal shift and/or a scale. The candidate image may be of a rectangular traffic sign and the alignment variables may be a vertical shift and/or a horizontal shift in the vertical and horizontal edges respectively of the rectangular traffic sign. For multiple alignment variables, a separate regression for each of the alignment variables may be performed.

The trained alignment classifier may be previously trained on multiple training images for the alignment classifier. The training images for the alignment classifier may be generated by marking multiple images as perfect images of a training set and by perturbing alignment of the perfect images. Alternatively, the training of images for the alignment classifier may be generated by detection of one or more candidate training images. The candidate training image(s) may be compared to at least one of the perfect images and a difference of the alignment variable may be output between the candidate training image and the at least one perfect image.

Prior to the classification of alignment, a preliminary object classification may be performed using a trained preliminary object classifier. Prior to performing the preliminary object classification, preliminary alignment classification may be performed by outputting preliminary alignment variable to the trained preliminary classifier.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 3 shows a generic procedure to produce a trained classifier.

FIGS. 4 and 5 show a candidate image being inputted to a trained classifier and a method respectively, according to a conventional procedure.

FIG. 6*a* shows an input and an output of an alignment classifier, according to a feature of the present invention.

FIG. 6*b* shows a flow diagram for training an alignment classifier, according to a feature of the present invention.

FIG. 7*a* illustrates a system, according to an aspect of the present invention.

FIG. 8*a* shows a corresponding method for the system shown in FIG. 7*a*, according to an aspect of the present invention.

FIG. 7*c* illustrates a system, according to an aspect of the present invention.

FIG. 8*c* shows a corresponding method for the system shown in FIG. 7*c*, according to an aspect of the present invention.

DETAILED DESCRIPTION

Figure 1:
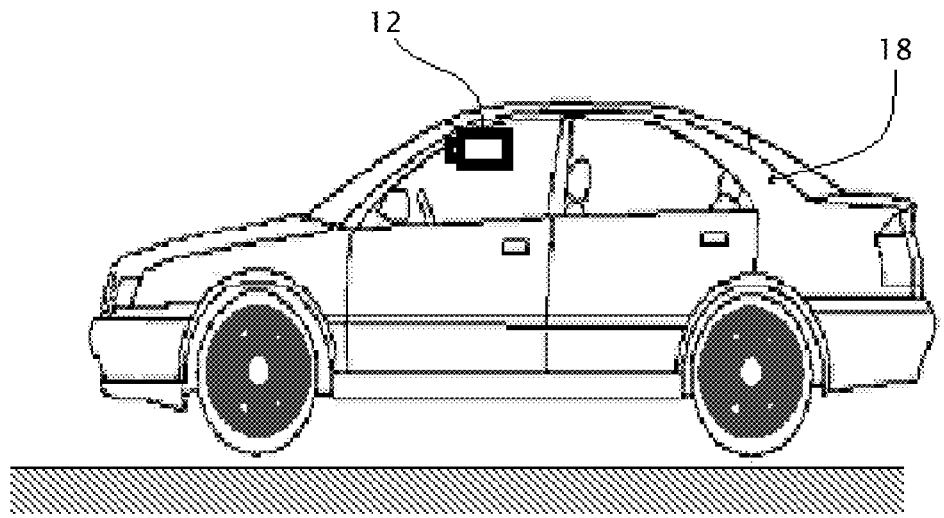
FIGS. 1 and 2 illustrate a system which includes a camera or image sensor mounted in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, embodiments of the present invention are directed to improved object detection and recognition by use of correctly aligned image candidates prior to classification. The initial candidate detection may use edge structure in the image e.g. of a traffic sign or a pedestrian. The initial objection detection may optionally use information regarding the expected object size in the image. A detection algorithm for North American rectangular speed signs may look for two vertical edges of similar and overlapping extent with opposite sign (black/white versus white/black) with some horizontal edges connecting the top and bottom. Pedestrian detection may look for edge elements in a rectangular shape with a 2:1 aspect ratio and the size and bottom edge defined by the road plane constraint and perspective of the image.

According to various methods as disclosed herein, after initial detection, image candidates are correctly aligned prior to classification by an alignment classifier adapted to determine correct alignment of the candidate image prior to classification and thereby improve the classification by reducing false positive and/or false negative classifications.

Figure 9A:
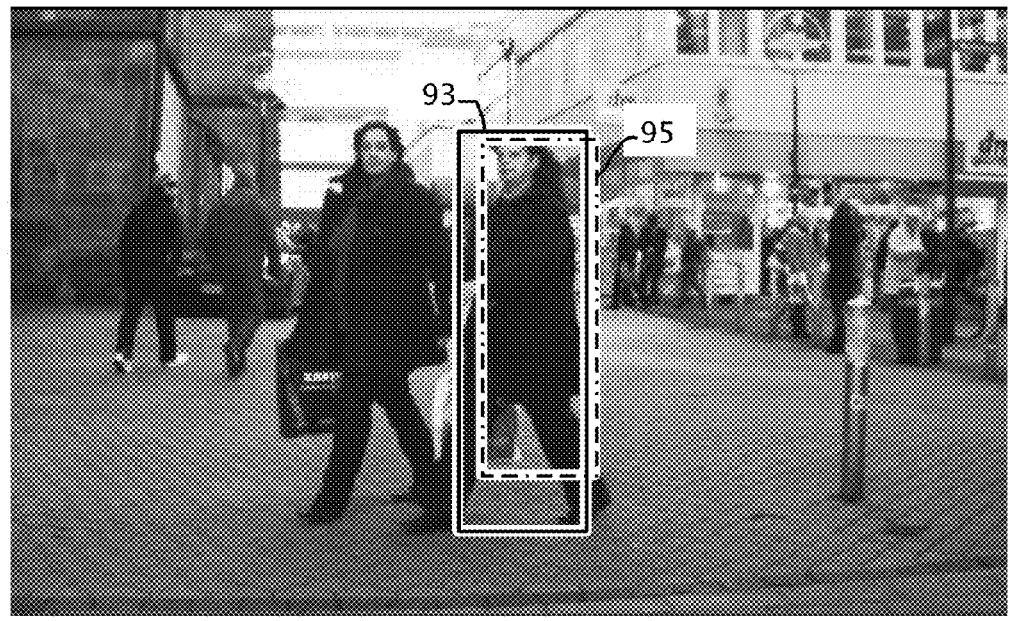
FIGS. 9*a* and 9*b*, show perfects shown as rectangles with a solid lines and the initial candidates with a dotted lines respectively, according to an aspect of the present invention.
Figure 9B:
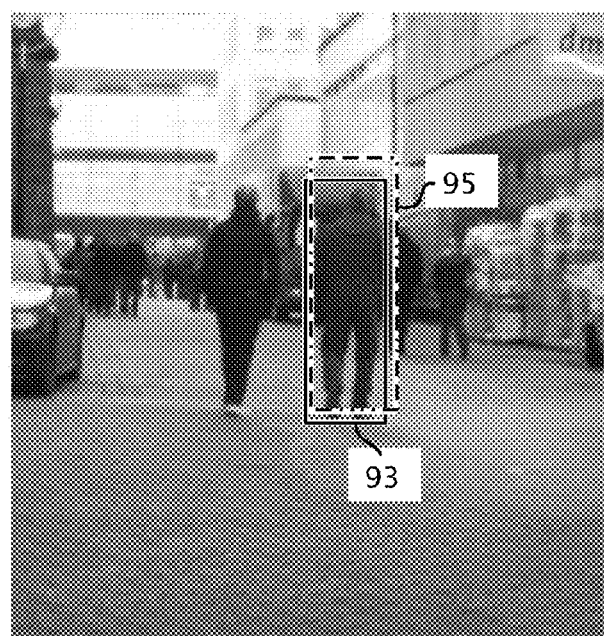
Figure 9C:
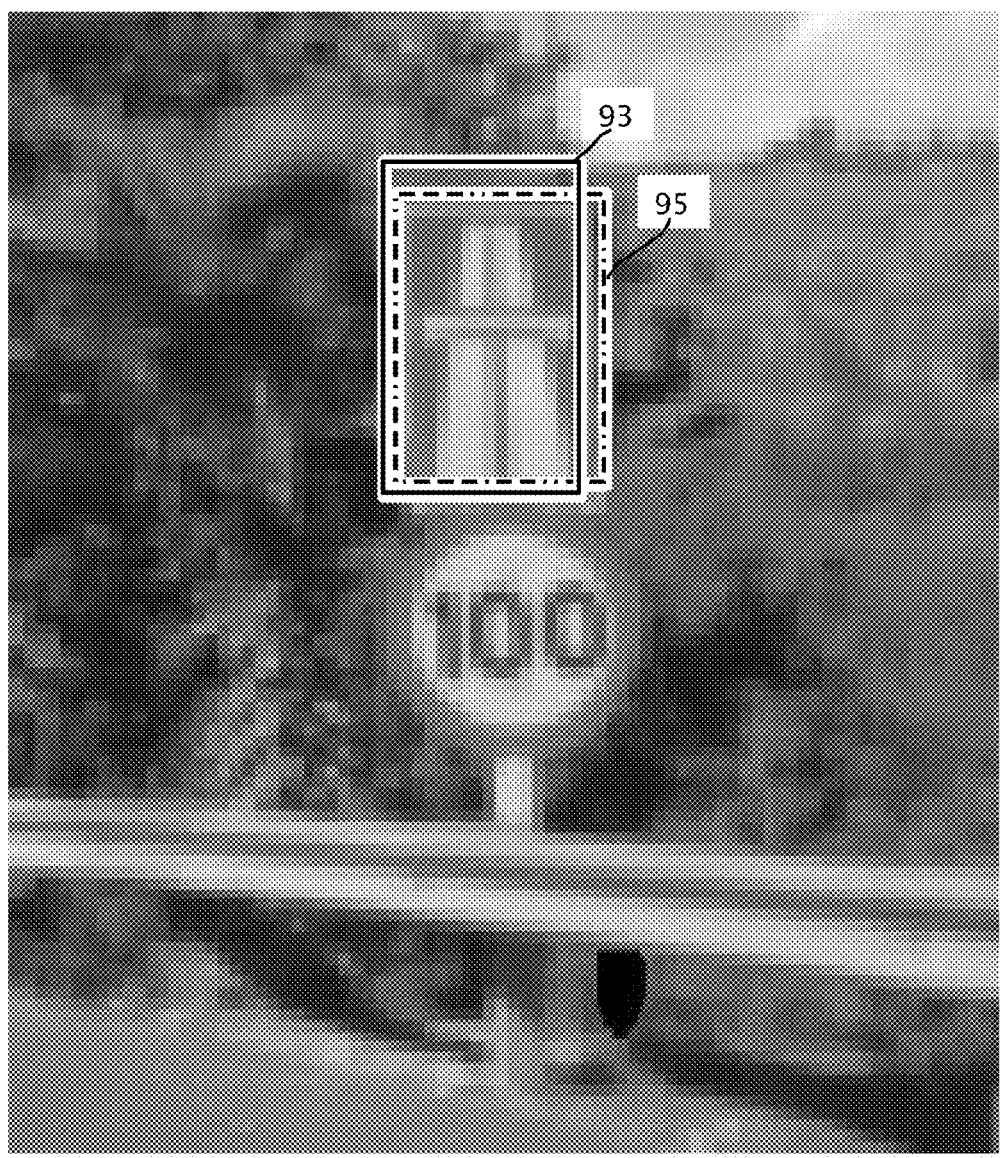
FIG. 9*c* shows a badly aligned example of rectangular traffic signs, according to an aspect of the present invention.

An example of a badly aligned candidate image is a rectangular traffic sign as shown in FIG. 9c, where the perfect is shown as rectangle with a solid line 93 and the initial candidate with a dotted line 95. Badly aligned examples of rectangular traffic signs make the training of conventional classifiers more difficult. Typical classifiers are support vector machines (SVM) using histograms of Gaussian distributions as the feature set. In the SVM case, badly aligned examples mean that the system may have difficulty to compact a set of support vectors with good discrimination capability. There may be various reasons for the difficulty.

Referring now to FIGS. 9a and 9b, the perfects are shown as rectangles with a solid line 93 and the initial candidates with dotted line 95. The features shown in FIGS. 9a and 9b are not always in the same location of the example: the head might be right at the top of the rectangle in some examples and quite a few rows down in another example. Sometimes not all the features are in the candidate rectangle: for example the feet or head which are very important structures for pedestrian detection might be cut off. A significant amount of background might be included in the example which has no information about the object class.

Figure 2:
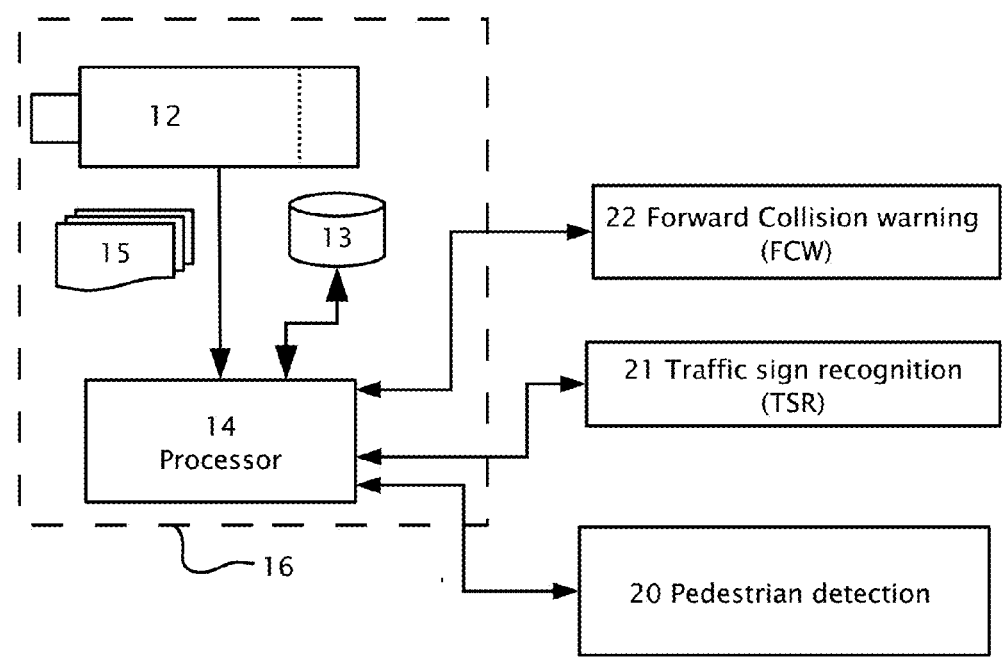

Reference is now made to FIGS. 1 and 2 which illustrate a system 16 including a camera or image sensor 12 mounted in a vehicle 18, according to an aspect of the present invention. Image sensor 12, imaging a field of view in the forward direction provides image frames 15 in real time and image frames 15 are captured by an image processor 14. Image processor 14 may be used to process image frames 15 simultaneously and/or in parallel to serve a number of driver assistance systems. The driver assistance systems may be implemented using specific hardware circuitry with on board software and/or software control algorithms in storage 13. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21 and forward collision warning (FCW) 22. Image processor 14 is used to process image frames 15 to detect and recognize an image in the forward field of view of camera 12.

Reference is now made to FIG. 3 which shows a generic procedure 30 to produce a trained classifier 35. Training (step 33) of the classifier is performed by providing a set of training images 31 of correctly classified candidates. An effective way to provide a set of training images 31 of correctly classified candidates is to manually mark the correct true target patch in an image. The marked correct true target patches in the image are defined herein as perfect images or perfects. Correctly classified candidate images are those that have significant overlap with the perfects. A classifier can be trained (step 33) using these correct candidates to give trained classifier 35.

Reference is now made to FIGS. 4 and 5 which show a candidate image 41 input to trained classifier 35 and a method 50 respectively, according to a conventional procedure. The candidate image 41 is input into trained classifier 35 (step 51). The candidate image 41 is given a classification (step 53). The classification may be that of a pedestrian or a traffic signal.

Once a candidate image or patch is detected and input (step 51) to classifier 35, classification 53 may be performed to decide if the patch is of the desired target class. The decision to decide if the patch is of the desired target class may require use of a series of classifiers with gradual increase in classification complexity and discrimination power. The final output of classification (step 53) may be a pedestrian or not a pedestrian or a particular speed value of a traffic sign.

According to an aspect of the present invention, the performance of trained classifier 35 can be significantly improved if the candidate images are correctly aligned prior to classification. FIG. 6a shows an input and an output of a trained alignment classifier 69, according to a feature of the present invention. The trained alignment classifier 69 may use class specific heuristics. In North America, orientation of an axis of symmetry of speed signs may be used, for example. The trained alignment classifier 69 is a 'black box' that receives an input from a candidate image 41 and provides an output of alignment variables 63. Equivalently, trained alignment classifier may output the candidate image re-aligned according to the alignment variables. In the case of pedestrians, alignment variables may be shifts in horizontal x and/or y vertical image dimension and the image scale (total of 3 values). In the case of rectangular traffic signs, alignment variables may be horizontal x and vertical y shift in the vertical and horizontal edges respectively (4 values). There may be separate regression classifiers applied for each of the alignment variables.

Reference is now made to FIG. 6b which shows a simplified flow diagram 64 for training alignment classifier, according to a feature of the present invention. Training images 65 for alignment are input to train (step 67) the alignment classifier.

Ways for generating training examples to give training images 65 to train (step 67) for alignment, so as to obtain a trained alignment classifier 69 may include:

1. For each perfect image, a random perturbation is generated. The resulting patch after perturbation is used as the input to the alignment classifier and the perturbation values relate to the output of the alignment classifier.

2. An initial candidate detection algorithm is performed on the image. Candidates that have enough overlap with the perfect images are used as the input to the alignment classifier. The difference between the candidate location and the perfect image location relates to the output of the alignment classifier.

Reference is now made to FIG. 7a illustrating a system 701a and FIG. 8a a corresponding method 801a, according to an aspect of the present invention. In step 83 a candidate image 41 is detected in images 15 captured in the field of view of camera 12.

In step 85a, candidate image 41 is input into trained alignment classifier 69a. Trained alignment classifier 69a provides an output of alignment variables 63a. In the case of pedestrians, alignment variables 63a may be shift in x and y and the scale (total of 3 values). In the case of rectangular traffic signs, alignment variables 63a may be x and y shift in the vertical and horizontal edges respectively (4 values). In an implementation of step 85a there may be separate regression classifiers for each of the alignment variables 63a. Trained alignment classifier 69a outputs (step 87) alignment variables 63a which are input along with candidate image 41 into trained object classifier 73a. Trained object classifier 73a provides a classification (step 89) of aligned candidate image 41. The classification step 89 indicates if the candidate image 41 is a traffic sign or a pedestrian for example.

Figures 7B, 8B:
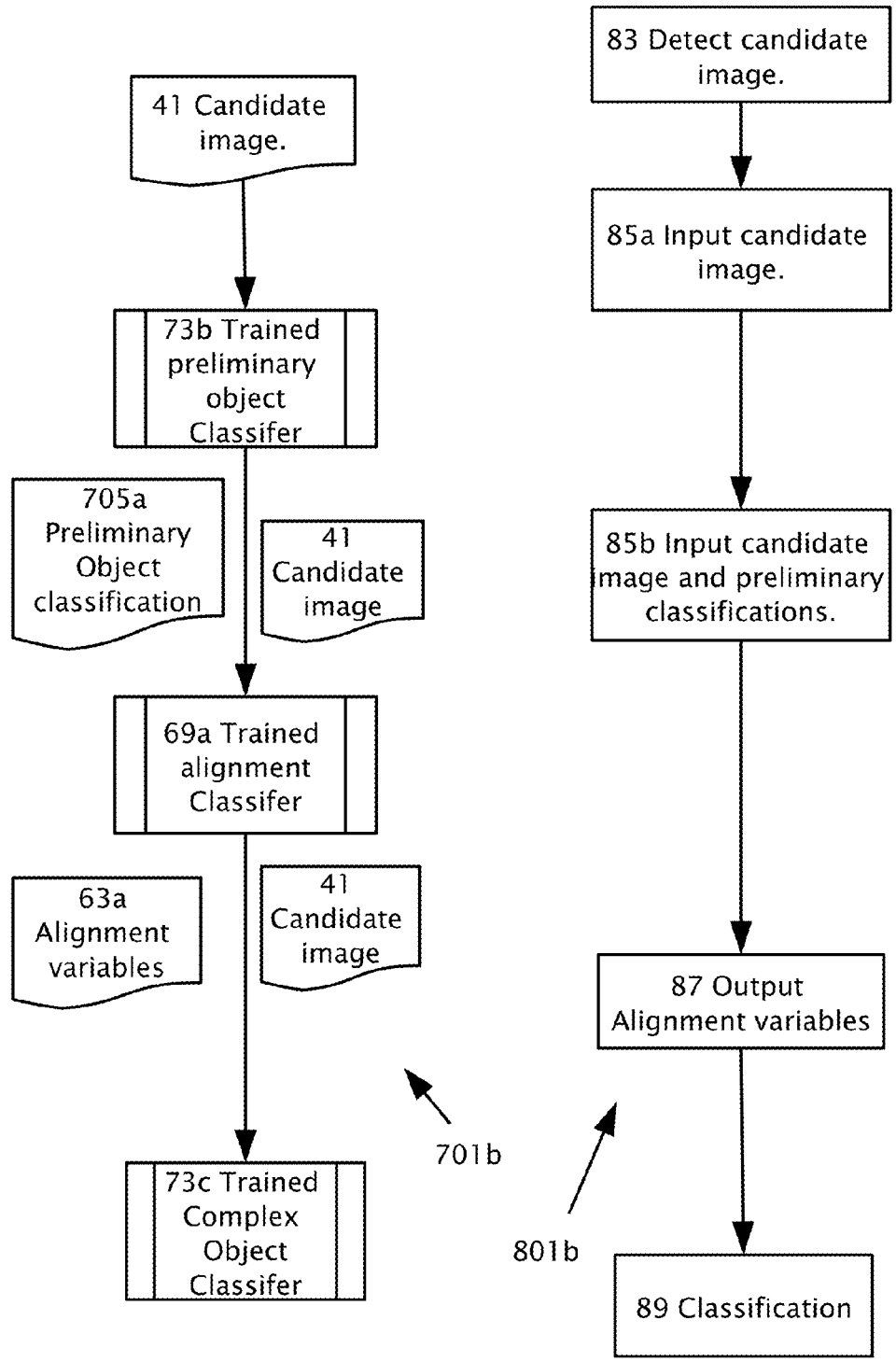
FIG. 7*b* illustrates a system, according to an aspect of the present invention.
FIG. 8*b* shows a corresponding method for the system shown in FIG. 7*b*, according to an aspect of the present invention.

Reference is now made to FIG. 7b illustrating a system 701b and FIG. 8b a corresponding method 801b, according to an aspect of the present invention. Method 801b is used when use of trained alignment classifier 69a may be computationally expensive to use if the candidate image 41 is inputted into classifier 69a directly. In step 83 a candidate image 41 is detected in the images 15 captured in the field of view of camera 12. In step 85a the detected candidate image 41 is input into trained preliminary object classifier 73b. Trained preliminary object classifier 73b is referred to as 'preliminary' since classifier 73b may be less computationally expensive, thereby producing a possible higher rate of false positive rate within preliminary object classifications 705a. In step 85b, candidate image 41 and preliminary classifications 705a are input into trained alignment classifier 69a. The output (step 87) of trained alignment classifier 69a alignment variables 63a which are input along with candidate image 41 into trained complex object classifier 73c. Trained complex object classifier 73c is "complex" in terms of being more computationally expensive when compared to preliminary object classifier 73b. Trained complex classifier 73c then provides a classification (step 89) of aligned candidate image 41 which derives from the previously less computational expensive step 85a and the alignment step 85b. The classification step 89 indicates if the candidate image 41 is a traffic sign or a pedestrian for example.

Reference is now made to FIG. 7c illustrating a system 701c and FIG. 8c a corresponding method 801c, according to an aspect of the present invention. Method 801c is a reverse of method 801b with respect to trained alignment classifier 69a being used prior to use of trained preliminary object classifier 73b. In step 83 a candidate image 41 is detected in images 15 captured in the field of view of camera 12. In step 85a candidate image 41 is inputted into trained alignment classifier 69a. Trained classifier 69a then outputs alignment variables 63a which are inputted (step 85c) along with candidate image 41 into trained preliminary object classifier 73b. The output of trained preliminary object classifier 73b (step 87a) includes preliminary classifications 705a which along with candidate image 41 and alignment values 63a are input (step 87b) into a second trained alignment classifier 69b. The output (step 87c) of trained alignment classifier 69b includes preliminary classifications 705a, alignment variables 63b which are input along with candidate image 41 into trained complex object classifier 73c. Trained complex classifier 73c then provides a final classification (step 89) of candidate image 41.

The term "scale" as used herein refers to a ratio between dimensions in image space of an object to the respective dimensions in real space of the object.

The terms "detection" and "detecting" as used herein refers to detecting a candidate image in the image frames which potentially includes an image of an object of interest, e.g. pedestrian, traffic sign, light source, and vehicle.

The terms "classification" and "classifying" as used herein refers to identifying the candidate image to include an image of a member of a class of objects, e.g. pedestrians, traffic signs, light sources, and vehicles.

The indefinite articles "a", "an" is used herein, such as "a candidate image", "an alignment variable" have the meaning of "one or more" that is "one or more candidate images" or "one or more alignment variables".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A method for classifying an object in the field of view of a camera, wherein a processor is configured to capture a plurality of image frames from the camera, the method comprising:
   detecting a candidate image in the image frames;
   determining alignment of said candidate image relative to at least one previously known training image by inputting the candidate image into a trained alignment classifier and outputting an alignment variable therefrom associated with the candidate image;
   inputting the candidate image and said alignment variable into a trained object classifier; and
   classifying the candidate image, wherein classifying the candidate image comprises classifying the object by the trained object classifier responsive to said alignment variable.

2. The method of claim 1, wherein the processor and the camera are included in a driver assistance system.

3. The method of claim 2, wherein said classifying the object comprises classifying the object as belonging to a single class of objects selected from the group consisting of: pedestrians, traffic signs, vehicles and light sources.

4. The method of claim 2, wherein the candidate image is of a pedestrian and said alignment variable is selected from the group consisting of: a vertical shift, a horizontal shift and a scale.

5. The method of claim 2, wherein the candidate image is of a rectangular traffic sign and said alignment variable is selected from the group consisting of: a vertical shift and a horizontal shift in the vertical and horizontal edges respectively of said rectangular sign.

6. The method of claim 1, wherein said variable includes a plurality of alignment variables, the method further comprising:
   performing a separate regression for each of said alignment variables.

7. The method of claim 1, further comprising
previously training said trained alignment classifier on a plurality of training images for said alignment classifier.

8. The method of claim 7 further comprising:
generating said training images by marking a plurality of images as perfect images of a training set and by perturbing alignment of said perfect images.

9. The method of claim 7 further comprising: generating said training images by:
marking a plurality of images as perfect images of a training set,
detecting a candidate training image,
comparing said candidate training image to at least one of said perfect images, and
outputting a difference of said alignment variable between said candidate training image and at least one of said perfect images.

10. The method of claim 1, further comprising:
prior to inputting the candidate image into the trained alignment classifier, performing a preliminary object classification using a trained preliminary object classifier.

11. The method of claim 10,
prior to said performing said preliminary object classification, preliminary alignment classifying by outputting at least one preliminary alignment variable and outputting said preliminary alignment variable to said trained preliminary classifier.

* * * * *